United States Patent
Minamitani

(10) Patent No.: US 10,712,256 B2
(45) Date of Patent: Jul. 14, 2020

(54) CORROSIVE ENVIRONMENT MONITORING DEVICE AND METHOD

(71) Applicant: Hitachi, Ltd., Chiyoda-ku, Tokyo (JP)

(72) Inventor: Rintarou Minamitani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 15/762,438

(22) PCT Filed: Aug. 25, 2016

(86) PCT No.: PCT/JP2016/074790
§ 371 (c)(1),
(2) Date: Mar. 22, 2018

(87) PCT Pub. No.: WO2017/061182
PCT Pub. Date: Apr. 13, 2017

(65) Prior Publication Data
US 2018/0259442 A1  Sep. 13, 2018

(30) Foreign Application Priority Data
Oct. 7, 2015  (JP) .................. 2015-199193

(51) Int. Cl.
*G01N 17/00*  (2006.01)
*G01N 17/04*  (2006.01)
(Continued)

(52) U.S. Cl.
CPC ......... *G01N 17/008* (2013.01); *G01N 17/002* (2013.01); *G01N 17/006* (2013.01);
(Continued)

(58) Field of Classification Search
CPC .. G01N 17/002; G01N 17/006; G01N 17/008; G01N 17/02; G01N 17/04; G01N 27/04; G01N 27/041; G01N 27/20
(Continued)

(56) References Cited

U.S. PATENT DOCUMENTS 3,156,887 A * 11/1964 Weikal .............. G01N 17/00
338/13
4,179,653 A * 12/1979 Davies ............... G01N 17/00
324/700
(Continued)

FOREIGN PATENT DOCUMENTS

EP  2 124 035 A1  11/2009
JP  10-90165 A  4/1998
(Continued)

OTHER PUBLICATIONS

Extended European Search Report issued in counterpart European Application No. 16853336.2 dated Jun. 7, 2019 (eight (8) pages).
(Continued)

*Primary Examiner* — Steven L Yeninas
(74) *Attorney, Agent, or Firm* — Crowell & Moring LLP

(57) ABSTRACT

Provided are a device and a method for corrosive environment monitoring that have high measurement precision and enable visual observation. The corrosive environment monitoring device includes a housing, a first thin metal film, a second thin metal film, and terminals. The housing has an opening in one side thereof. The other sides of the housing than the one side are sealed to form space inside the housing. The first thin metal film extends in a direction from the bottom of the space toward the opening. The first thin metal film is resistant to corrosion by a corrosive substance and serves as a supporting member. The second thin metal film extends in the space in a direction from the bottom of the space toward the opening and is supported by the first thin metal film. The second thin metal film is susceptible to corrosion by the corrosive substance and serves as a measuring member. The terminals are disposed at both ends of the first thin metal film, where an external voltage is to be applied to the terminals. The first thin metal film includes one first thin metal film extending in a direction from the (Continued)

bottom of the space toward the opening. The second thin metal film is disposed on one or both sides of the one first thin metal film and extends in the space in a direction from the bottom toward the opening.

19 Claims, 13 Drawing Sheets

(51) Int. Cl.
    *G01N 27/04* (2006.01)
    *G01N 27/20* (2006.01)
(52) U.S. Cl.
    CPC ........... *G01N 17/04* (2013.01); *G01N 27/041* (2013.01); *G01N 27/20* (2013.01)
(58) Field of Classification Search
    USPC .................................................. 324/693, 700
    See application file for complete search history.

(56) References Cited

U.S. PATENT DOCUMENTS

| | | | | | |
|---|---|---|---|---|---|
| 4,752,360 | A | * | 6/1988 | Jasinski | ................. G01N 17/02 205/776.5 |
| 4,784,729 | A | * | 11/1988 | Jasinski | ................. G01N 17/02 205/775.5 |
| 4,863,572 | A | * | 9/1989 | Jasinski | ................. G01N 17/02 205/775.5 |
| 5,243,297 | A | * | 9/1993 | Perkins | ................. G01N 17/00 204/404 |
| 5,259,944 | A | * | 11/1993 | Feliu | ..................... G01N 17/02 204/404 |
| 6,132,593 | A | * | 10/2000 | Tan | ........................ G01N 17/02 204/404 |
| 8,475,110 | B2 | * | 7/2013 | Hefner | .................... G01N 17/02 134/18 |
| 2010/0206729 | A1 | * | 8/2010 | Ishida | .................... G01N 17/04 204/404 |
| 2012/0176148 | A1 | | 7/2012 | Chey et al. | |
| 2014/0190239 | A1 | | 7/2014 | Minamitani | |
| 2015/0330889 | A1 | | 11/2015 | Minamitani et al. | |
| 2017/0089828 | A1 | * | 3/2017 | Allahar | ................. G01N 17/02 |

FOREIGN PATENT DOCUMENTS

| | | |
|---|---|---|
| JP | 2003-294606 A | 10/2003 |
| JP | 2005-207813 A | 8/2005 |
| JP | 2007-163324 A | 6/2007 |
| JP | 2013-190241 A | 9/2013 |
| WO | WO 2013-042179 A1 | 3/2013 |
| WO | WO 2014/009696 A1 | 1/2014 |

OTHER PUBLICATIONS

International Search Report (PCT/ISA/210) issued in PCT Application No. PCT/JP2016/074790 dated Nov. 15, 2016 with English-language translation (five (5) pages).
Japanese-language Written Opinion (PCT/ISA/237) issued in PCT Application No. PCT/JP2016/074790 dated Nov. 15, 2016 (five (5) pages).
Minamitani, "Estimation of Corrosion Rate of Silver Exposed to Sulfur Vapor," Zairyo-to-Kankyo (Corrosion Engineering), vol. 56, pp. 265-271(2007).

* cited by examiner

FIG. 10
FIG. 11
| | MEASURED RESISTIVITY (Ωm@20°C) | RESISTIVITY IN LITERATURE (Ωm@20°C) | MEASURED TCR (1/°C Ωm@20°C) | TCR IN LITERATURE (1/°C) |
|---|---|---|---|---|
| Ag | 2.84 to 2.88E-8 | 1.59E-8 | 2.07 to 2.14E-3 | 6.1E-3 |
| Ag₂S | 4.52E-5 | | -4.89E-3 | |
| Cr | 7.38 to 7.56E-7 | 1.29E-7 | (2.47) to 4.49E-5 | 5.9E-5 |
| Ti | 2.58E-6 | 4.27E-7 | 7.36E-4 | |
| IZO | | 3E-6 | | |
FIG. 12
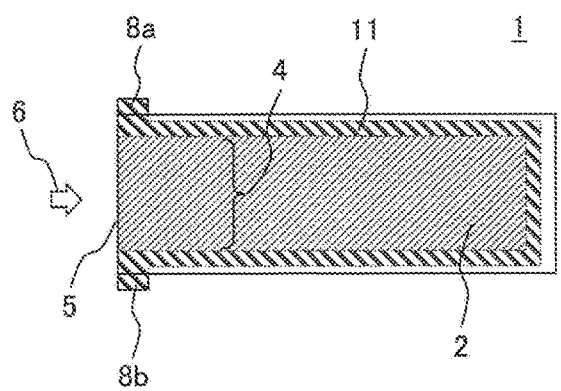

CORROSIVE ENVIRONMENT MONITORING DEVICE AND METHOD

TECHNICAL FIELD

The present invention relates to a device and a method for corrosive environment monitoring, each of which measures a degree of corrosion by a corrosive substance present in an indoor environment, mainly in an environment where electric/electronic equipment is placed.

BACKGROUND ART

An exemplary background art in the technical field is disclosed in Japanese Patent Application Laid-Open No. 2003-294606 (Patent Literature 1). The environmental assessment device disclosed in this literature basically includes 1) an element unit that reacts with a gaseous component in the environment, 2) a unit that detects the change of the element and converts the detected data into an electric signal, and 3) a unit that stores the measured data. The device employs, as the sensing element, thin metal films (thin metal films each having a thickness of 0.1 μm and being made of one of silver, copper, iron, and stainless steels). The device assesses an environment where a material is placed, by measuring a time-related change of at least one property, of the thin metal films, selected from optical reflectance, light transmittance, and electric resistance, and detecting a gaseous component in the environment. When the time-related change of the electric resistance is to be measured, the thickness of a corroded layer can be calculated, and thereby the corrosion rate can be easily determined, by measuring the change of the electric resistance caused by the change of the entire thin film (general corrosion).

A gas detecting system, which detects the change in the element and converts the change into an electric signal, includes a gas introducing unit and a gas sensing element unit (unit corresponding to a sensor unit in the present invention). The gaseous component is fed via a suction pump in the gas introducing unit to the gas sensing element unit. The technique can provide an analyzer that is very useful for environmental assessments for various materials, under circumstances where the global environment varies.

CITATION LIST

Patent Literature

Patent Literature 1: Japanese Patent Application Laid-Open No. 2003-294606

SUMMARY OF INVENTION

Problems to be Resolved by the Invention

Electric/electronic equipment requires long-term reliability so as to be stably operated. In addition, such electric/electronic equipment employs a high-density packaging structure for higher speed and for space saving and includes a large number of electric/electronic components including micro wiring structures and/or thin film plating structures. To provide satisfactory reliability of the electric/electronic equipment, corrosion damage on the electric/electronic components is to be restrained. This is because even slight corrosion damage on the electric/electronic components causes a change in electrical properties or magnetic properties and causes failure and/or malfunction of the equipment. Demands have been made to provide a technique for simple, rapid, precise/accurate, sustainable assessment of the corrosivity of the environment where the electric/electronic equipment is placed. Such technique is demanded so as to reflect an anticorrosion measure to the design and maintenance of the equipment, where the measure corresponds to the degree (magnitude) of corrosivity of the environment.

As a method for assessing the corrosivity of an environment where electric/electronic equipment is placed, the ISO 11844-1 standard generally employs a method for assessing the degrees of corrosion of copper, silver, aluminum, iron, and zinc, each of which has been exposed to the environment for a predetermined time. It is known that copper, silver, aluminum, iron, and zinc are corroded by any of $SO_2$, $NO_2$, and $H_2S$, which are corrosive substances, while the degrees of corrosion vary from substance to substance.

Assume that the environmental assessment method according to the background art and the environmental assessment device using the method employ a thin silver film having a thickness of 0.1 μm (100 nm) to measure the time-related change of electric resistance of the film. In this case, a time period during which the sensor can perform measurement is about one month, when used for assessing an environment with "medium corrosivity" prescribed in ISO 11844-1. This environment is an environment that may cause equipment fault by corrosion and is an environment in which the exposed silver film is corroded in a rate of 105 to 410 nm/year. The time period during which the sensor can perform measurement is still shorter when used for assessing an environment with "high corrosivity" or an environment with "very high corrosivity". The environment with high corrosivity is an environment where the silver film exposed to the environment is corroded in a rate of 410 to 1050 nm/year. The environment with very high corrosivity is an environment where the silver film exposed to the environment is corroded in a rate of 1050 to 2620 nm/year. Both of these environments may highly possibly cause such corrosion as to affect the reliability of the equipment and essentially require improvement in environment and/or structure. Thus, the method and device in these cases are not suitable for long-term measurements. Such long-term measurements become possible by increasing the thickness of the thin film. Disadvantageously, however, with an increasing thickness, the variation in thickness increases, and thereby the measurement precision decreases.

Assume that local corrosion of the sensor unit, such as corrosion adjacent to a portion where dust and/or salts are deposited, occurs in the environmental assessment method according to the background art and the environmental assessment device using the method. In this case, disadvantageously, the time period during which the sensor can perform measurement is shortened as compared with the original time period during which the sensor can perform measurement.

In addition and disadvantageously, when the gas sensing element unit (sensor unit) is exposed directly to a target environment, the amount of corrosion varies depending on the flow rate in the target environment.

These problems or disadvantages have to be solved, when a corrosive environment monitoring device measures the degree of corrosion by a corrosive substance present in an environment where electric/electronic equipment is placed.

Assume that the corrosive environment monitoring device is to be mounted adjacent to the electric/electronic equipment. In this case, the corrosive environment monitoring device is preferably small-sized, provides accurate reflection on numerical values from the degree of corrosion, and has such a structure as to enable visual observation of the degree of corrosion.

Under these circumstances, the present invention has an object to provide a device and a method for corrosive environment monitoring which have high measurement precision and by which the measured result is visible.

Means of Solving the Problems

To achieve the object, the present invention provides, in one aspect, a corrosive environment monitoring device. The corrosive environment monitoring device includes a housing, a first thin metal film, a second thin metal film, and terminals. The housing has an opening in one side thereof. The other sides of the housing than the one side are sealed to form space inside the housing. The first thin metal film extends in a direction from the bottom of the space toward the opening. The first thin metal film is resistant to corrosion by a corrosive substance and serves as a supporting member. The second thin metal film extends in the space in a direction from the bottom of the space toward the opening and is supported by the first thin metal film. The second thin metal film is susceptible to corrosion by the corrosive substance and serves as a measuring member. The terminals are disposed at both ends of the first thin metal film, where an external voltage is to be applied to the terminals. The first thin metal film includes one first extending in a direction from the bottom of the space toward the opening. The second thin metal film is disposed on one or both sides of the one first thin metal film and extends in the space in a direction from the bottom toward the opening.

The present invention provides, in another aspect, a corrosive environment monitoring device. This corrosive environment monitoring device includes a housing, a first thin metal film, a second thin metal film, and measuring terminals. The housing includes space that opens only in one side of the housing. The first is resistant to corrosion by a corrosive substance. The second is disposed in the space, is supported by the first thin metal film, and is susceptible to corrosion by the corrosive substance. The measuring terminals are constituted by both ends of the first thin metal film. The first thin metal film and the second thin metal film are disposed so that the electric resistance between the terminals forms a series circuit including a first parallel circuit and a second parallel circuit. The first parallel circuit includes the electric resistance of the second thin metal film before corrosion, and the electric resistance of the first thin metal film. The second parallel circuit includes the electric resistance of the second thin metal film after corrosion, and the electric resistance of the first thin metal film.

The present invention provides, in yet another aspect, a method for monitoring a corrosive environment based on the degree of corrosion of a thin metal film, where the thin metal film is disposed in at least one channel that controls entering of a corrosive substance from an atmosphere. The method includes measuring an electric resistance of the thin metal film, where the electric resistance varies depending on growth of a corroded region of the thin metal film, where the corrosion in the corroded region is caused by the corrosive substance entering the channel through an opening of the channel. On the basis of the measured electric resistance, the corrosivity of the environment is quantitatively determined.

Advantageous Effects of the Invention

With the present invention, the amount (degree) of corrosion propagating from the opening can be determined accurately with less variation in corrosion amount, and the corrosivity of the environment can be quantitatively determined, where the corrosion amount varies depending on the flow rate in the atmosphere in the target environment, on local corrosion (such as corrosion adjacent to a portion where dust and/or salts are deposited) of the sensor unit, and/or on the thickness of the metal film.

BRIEF DESCRIPTION OF DRAWINGS

FIG. 10 is a cross-sectional side view of the corrosive environment monitoring device according to Embodiment 1 and illustrates how the thin metal film is corroded at Time B after exposure;

FIG. 11 illustrates a table indicating the resistivity and temperature coefficient of resistance (TCR) of thin metal films;

FIG. 12 is a schematic cross-sectional top view of a corrosive environment monitoring device according to a comparative example corresponding to Embodiment 1;

DESCRIPTION OF EMBODIMENTS

Some embodiments of the present invention, which can combine measurement precision and visibility, will be illustrated with reference to the attached drawings. In these embodiments, there are mainly illustrated embodiments relating to corrosive environment monitoring devices and methods for measuring the degree of corrosion by a corrosive substance present in an environment where electric/electronic equipment is placed.

Embodiment 1

FIGS. 1 to 4 illustrate an exemplary configuration of the corrosive environment monitoring device according to Embodiment 1. FIGS. 1, 2, 3, and 4 are a cross-sectional top view, a cross-sectional side view, a cross-sectional front view, and an external perspective view, respectively, of the corrosive environment monitoring device.

Figure 4:
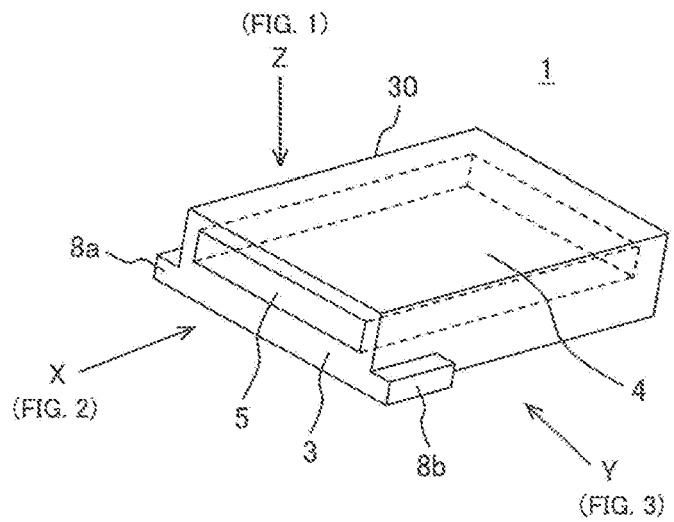
FIG. 4 is a schematic perspective view of the corrosive environment monitoring device according to Embodiment 1.

The corrosive environment monitoring device 1 houses components in a housing 30, as illustrated in the external perspective view of FIG. 4. The housing 30 has an opening 5 in one side thereof and includes space 4. The space 4 is formed by sealing another side opposite to the opening 5. The space serves as a channel for a corrosive substance. A transparent insulating substrate 3 constitutes the underside (in the figure) of the housing 30 and bears principal components thereon. The housing 30 bears, on side faces near the opening 5, terminals 8a and 8b which extract the output from a sensor disposed inside the housing 30.

Figure 2:
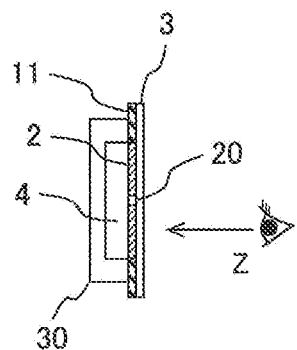
FIG. 2 is a cross-sectional side view of the corrosive environment monitoring device according to Embodiment 1.

FIG. 2 is a cross-sectional side view, when seen from the X-direction in FIG. 4, of the corrosive environment monitoring device 1 illustrated in FIG. 4. On the transparent insulating substrate 3, a thin metal film 2 is supported by, and secured to, a thin metal film 11. The thin metal film 2 serves as a measuring member. The thin metal film 11 serves as a supporting member. The thin metal film 11 herein is a thin metal film that resists (tends to resist) corrosion in a target environment; and the thin metal film 2 is a thin metal film that is corroded (is susceptible to corrosion) in the target environment. The thin metal film 2 is disposed so as to face space 4, where the thin metal film 2 serves as a measuring member, and the space 4 serves as a channel for a corrosive substance. The thin metal film 2 has a slit 20 in a central part thereof.

Figure 3:
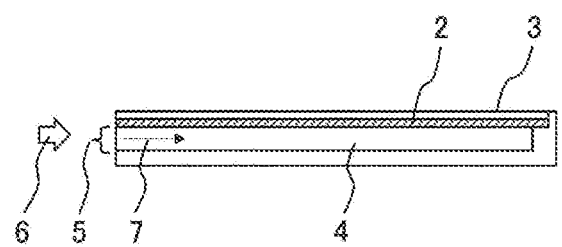
FIG. 3 is a cross-sectional front view of the corrosive environment monitoring device according to Embodiment 1.

FIG. 3 is a cross-sectional front view, when seen from the Y direction in FIG. 4, of the corrosive environment monitoring device 1 of FIG. 4. FIG. 3 demonstrates that the housing has the opening 5 in one side thereof, and has another side opposite to the opening 5 being sealed to form the space 4 inside the housing, and that the space is used as a channel for the corrosive substance 6. FIG. 3 also demonstrates that the thin metal film 2 is affected by the corrosive substance, because the thin metal film 2 is disposed so as to be exposed to the space 4 which serves as a channel for the corrosive substance 6.

Figure 1:
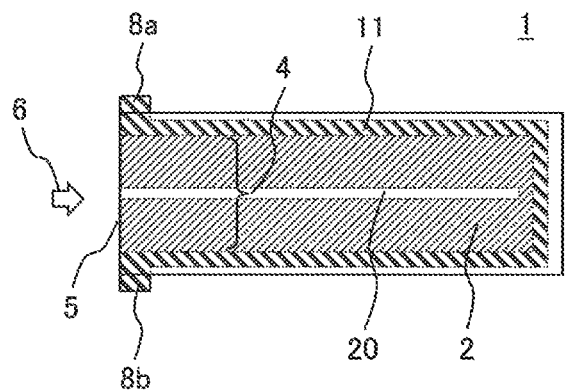
FIG. 1 is a cross-sectional top view of a corrosive environment monitoring device according to Embodiment 1.

FIG. 1 is a cross-sectional top view, when seen from the Z direction in FIG. 4, of the corrosive environment monitoring device 1 of FIG. 4. With reference to FIG. 1, the measuring member thin metal film 2 is surrounded by, supported by, and secured to, the supporting member thin metal film 11; and the thin metal film 2 extends toward the depth direction of the space 4. The slit 20 divides the measuring member thin metal film 2 to a portion adjacent to the deepmost portion (bottom), where the slit 20 is disposed at the central part of the bottom. With this configuration, the electric resistance between the terminals 8a and 8b is defined (determined) by the electric resistances of the measuring member thin metal film 2 and of the supporting member thin metal film 11. In this case, the electric resistance of the measuring member thin metal film 2 is affected by corrosion by the corrosive substance 6 and is variable.

The corrosive environment monitoring device 1 according to Embodiment 1 as exemplarily illustrated in FIGS. 1 to 4 includes a sensor unit. The sensor unit is disposed as part of a wall in the channel 4 having the opening 5 and includes the thin metal film 2 which is disposed on the insulating substrate 3. The thin metal films herein includes the thin metal film 2 and the thin metal film 11, where the thin metal film 2 is exposed to the channel 4, and the thin metal film 11 is electrically coupled to the thin metal film 2. The thin metal film 2 has the slit 20 approximately parallel to the diffusion direction of the corrosive substance 6. At both ends of the thin metal film 2, the terminals 8a and 8b are disposed to measure an electric resistance. The housing 30 itself may be transparent. Such a configuration that at least the insulating substrate 3 is transparent enables visual observation of how corrosion of the thin metal film 2 proceeds, from the Z direction in FIG. 2.

Non-limiting examples of a material to constitute the measuring member thin metal film 2 include aluminum, iron, zinc, and other metal materials, in which an elementary metal and its corrosion product differ in electric resistance from each other; in addition to copper and silver, which have been used for corrosion monitoring of an environment in which electric/electronic equipment is placed. Non-limiting examples of a material to constitute the supporting member thin metal film 11 include such materials as to be approximately uncorroded (resist corrosion) in the target environment, such as titanium, chromium, gold, palladium, and silver-palladium alloys.

In FIG. 2, the thin metal film 2 and the thin metal film 11 are in contact with each other at side faces of the two thin films. It is also acceptable that the two thin films overlap or overlie each other. In this case, either one of the thin metal film 2 and the thin metal film 11 may be located above the other, with respect to the insulating substrate 3.

When the corrosive environment monitoring device 1 having the configuration according to Embodiment 1 is exposed to an environment, the corrosive substance 6 present in the environment enters the channel 4 through the opening 5 and corrodes the thin metal film 2, as illustrated in FIG. 3. The channel 4 has the function of controlling the rate of corrosion of the thin metal film 2, where the corrosion rate is sensing of corrosion by the corrosive substance 6 present in the environment. The channel 4 has one opening 5 (left side of the channel in FIG. 1), where the channel has no opening in the right side and is blocked from the ambient environment. This impedes the flow of the corrosive substance 6 in the ambient atmosphere, if moves toward the opening 5, from entering the channel 4 through the opening 5. In this view, in corrosive environment monitoring according to the background art, the sensor unit is in direct contact with the flow of the ambient atmosphere, and the corrosion of the sensing metal is promoted when the ambient atmosphere flows fast over the surface of the metal.

In the present invention, the corrosive substance 6 adjacent to the opening 5 of the channel 4 enters, by diffusion alone, in the direction of diffusion 7 of the corrosive substance. This allows the corrosive environment monitoring device 1 to measure the degree of corrosion by the corrosive substance, without being affected by the flow of the ambient atmosphere. In the present invention, the corrosion proceeds in a given (constant) direction, and this reduces the measurement variation. As used herein, the term "corrosive substance" refers to not only so-called corrosive substances, but also airborne sea salt and dust. A so-called corrosive substance will be described below as a representative example of the "corrosive substance".

Next, a method for quantitatively determining the corrosive substance 6 by the corrosive environment monitoring device 1 will be described, where the corrosive substance 6 to be quantitatively determined diffuses into the channel 4 and is present adjacent to the opening 5.

In Embodiment 1 illustrated in FIGS. 1 to 4, the direction of the diffusion 7 of the corrosive substance 6 is limited to the direction from the left side in FIGS. 1 and 3, so as to control corrosion in the corrosive environment monitoring device 1. With approaching the opening 5, the concentration flux of the corrosive substance increases, and the thin metal film 2 is more corroded in the left side approaching the opening 5. This behavior is described in "Estimation of Corrosion Rate of Silver Exposed to Sulfur Vapor" in Journal "Zairyo-to-Kankyo (Corrosion Engineering)", vol. 56, pp. 265-271(2007). In this article, it is experimentally and analytically determined that the corrosion rate decreases with an increasing distance from a source of such corrosive substance, where the experiments are performed using metal sheets. Using this technique, the corrosion behavior of the corrosive environment monitoring device 1 can be analyzed.

Figure 5:
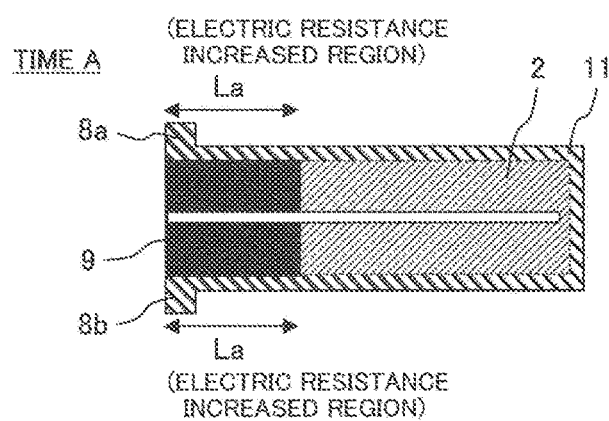
FIG. 5 is a cross-sectional top view of the corrosive environment monitoring device according to Embodiment 1 and illustrates how the thin metal film is corroded at Time A after exposure.
Figure 6:
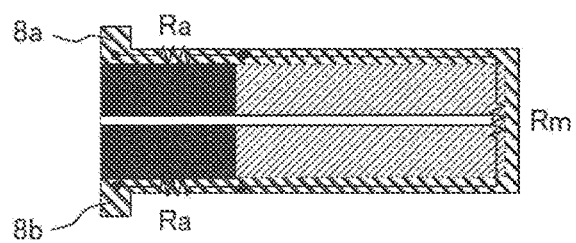
FIG. 6 is a cross-sectional top view of the corrosive environment monitoring device according to Embodiment 1 and illustrates the electric resistance of the thin metal film, as measured at Time A after exposure.
Figure 7:
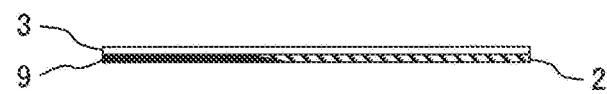
FIG. 7 is a cross-sectional side view of the corrosive environment monitoring device according to Embodiment 1 and illustrates how the thin metal film is corroded at Time A after exposure.
Figure 8:
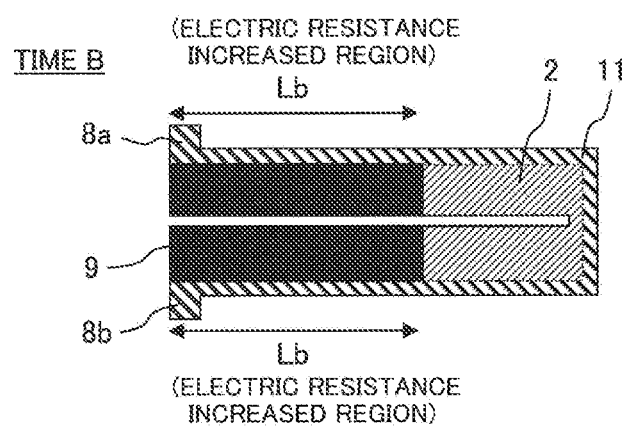
FIG. 8 is a cross-sectional top view of the corrosive environment monitoring device according to Embodiment 1 and illustrates how the thin metal film is corroded at Time B after exposure.
Figure 9:
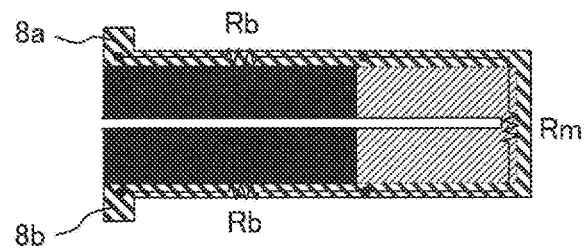
FIG. 9 is a cross-sectional top view of the corrosive environment monitoring device according to Embodiment 1 and illustrates the electric resistance of the thin metal film, as measured at Time B after exposure.

How the thin metal film is corroded in the corrosive environment monitoring device 1 after exposure will be described with reference to FIGS. 5 to 10. FIGS. 5 to 7 illustrate how the thin metal film is corroded at a certain time (Time A) after exposure, and FIGS. 8 to 10 illustrate how the corrosion of the thin metal film proceeds at a later time (Time B). FIGS. 5, 7, 8, and 10 illustrate corroded regions, and FIGS. 6 and 9 illustrate the electric resistance corresponding to the corrosion states illustrated respectively in FIGS. 5 and 8.

As illustrated in these figures, the thin metal film 2 used in the present invention is corroded no more in a region where the thin metal film is corroded to a corrosion thickness equal to the thin film thickness (region where the corrosion of the thin metal film reaches the interface with the substrate). The corrosive substance 6 present in the environment keeps on diffusing from the left side near to the opening 5 and further corrodes the thin metal film in the right side.

As illustrated in FIG. 5 and FIG. 8 in contrast to each other, a corroded region 9 of the thin metal film 2 has a length La at Time A, but extends further to have a length Lb at Time B, where, in the corroded region 9, the thin metal film 2 is corroded entirely in the thickness direction. Thus, the corroded region 9, in which the thin metal film 2 is corroded entirely in the thickness direction, is formed in the thin metal film 2 which is exposed to the channel 4, and the thin metal film 11 alone remains, because the thin metal film 11 is not corroded in the target environment.

As illustrated in FIG. 6 and FIG. 8 in contrast to each other, the electric resistance between the terminals 8a and 8b is a sum of the electric resistance Rm of the thin metal film 2 and the electric resistance Ra or Rb of a region where the thin metal film 11 remains alone, where the thin metal film 11 is not corroded in the target environment. Thus, the electric resistance equals 2Ra+Rm at Time A, and equals 2Rb+Rm at Time B, where Rm<<Ra, Rm<<Rb, and Rm at Time A is approximately equal to Rm at Time B.

As illustrated in FIG. 7 and FIG. 10 in contrast to each other, the thin metal film 2 is partially corroded at the surface of the thin metal film exposed to the channel, in addition to the corroded region 9, where the thin metal film is corroded entirely in the thickness direction. For the convenience of description, the partial corrosion at the surface of the thin metal film exposed to the channel is not considered herein.

In the corrosive environment monitoring device 1 according to Embodiment 1, the sensor unit includes the thin metal film 2 and the thin metal film 11 in combination. The embodiment, however, does not merely select the thin metal film 2 as a measuring member, and the thin metal film 11 as a supporting member, but selects or determines these components in consideration of the resistivity given in FIG. 11, and of the temperature.

FIG. 11 illustrates a table indicating the measured values and literature values of the resistivity, and measured values and literature values of the temperature coefficient of resistance (TCR), of silver Ag and silver sulfide $Ag_2S$ as typically examples of the measuring member thin metal film 2; and of chromium Cr and titanium Ti as typical examples of the supporting member thin metal film 11. The measured values demonstrate that silver Ag as the thin metal film 2 has a sufficiently lower measured resistivity as compared with the measured resistivities of chromium Cr and titanium Ti each as the thin metal film 11; but, when silver Ag is corroded into silver sulfide $Ag_2S$, silver sulfide has a sufficiently higher measured resistivity as compared with the measured resistivities of chromium Cr and titanium Ti. The measured values also demonstrate that silver Ag as the thin metal film 2 has a measured TCR sufficiently higher as compared with the measured TCRs of chromium Cr and titanium Ti each as the thin metal film 11; and that this relationship does not approximately change even when silver Ag is corroded into silver sulfide $Ag_2S$.

In the corrosive environment monitoring device 1 according to Embodiment 1, the electric resistance of the region in which the thin metal film 11 alone remains as a result of corrosion is measured, where the thin metal film 11 serves as a sensor unit and is not corroded by corrosion in the target environment. Thus, the sensor can have higher sensitivity by making the thin metal film 11 from a material having a high electric resistivity. For example, in the examples in FIG. 11, titanium Ti (electric resistivity: 4.27E-7 Ωm) has an electric resistivity 25 folds the electric resistivity of silver Ag (electric resistivity: 1.59E-8 Ωm) as the thin metal film in the sensor unit. When the titanium Ti film is designed to have a thickness one tenth the thickness of the silver Ag film (1 μm herein), the sensitivity increases by 250 times.

Figure 13:
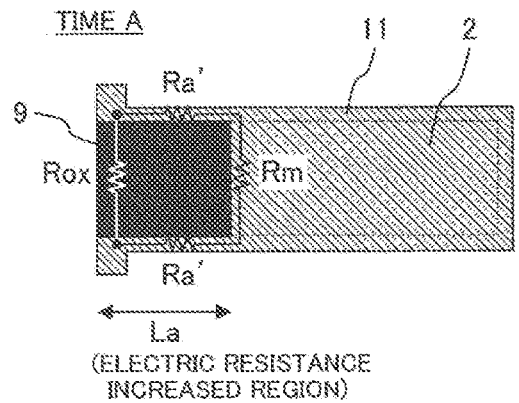
FIG. 13 is a cross-sectional top view of the corrosive environment monitoring device according to the comparative example corresponding to Embodiment 1 and illustrates the electric resistance of the thin metal film, as measured at Time A after exposure.
Figure 14:
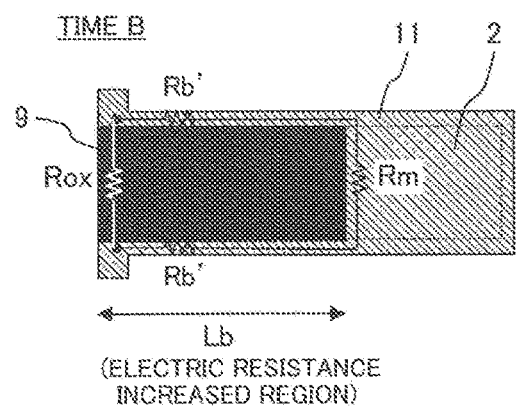
FIG. 14 is a cross-sectional top view of the corrosive environment monitoring device according to the comparative example corresponding to Embodiment 1 and illustrates the electric resistance of the thin metal film, as measured at Time B after exposure.

In Embodiment 1, the thin metal film 2 has the slit 20 extending approximately parallel with the direction of the diffusion 7 of the corrosive substance 6. Advantageous effects of this configuration will be described below. The description will be made in contrast to a corrosive environment monitoring device 1 without slit 20, as illustrated in FIG. 12. The device in FIG. 12 has configurations approximately equal to those of the device in FIG. 1, except for not having the slit 20. FIG. 13 illustrates the electric resistance in a corrosion state at a certain time (Time A) after exposure, as with FIG. 6. FIG. 14 illustrates the electric resistance in a corrosion state at a later time (Time B) where the corrosion proceeds still more, as with FIG. 9.

As illustrated in FIGS. 13 and 14, the corroded region 9 has a length La at Time A, whereas the corroded region 9 of the thin metal film 2 grows toward the right side and has a larger length Lb at Time B, in which the thin metal film 2 is corroded entirely in the thickness direction in the corroded region 9. In the thin metal film 2 exposed to the channel 4, the corroded region 9 in which the thin metal film 2 is corroded entirely in the thickness direction is formed, and the thin metal film 11 alone remains in a conduction portion, where the thin metal film 11 is not corroded in the target environment. In this stage, the electric resistance between the terminals 8a and 8b is a sum of the electric resistance Rm of the thin metal film 2 and the electric resistance Ra' of the region where only the thin metal film 11 remains, as the thin metal film 11 is not corroded in the target environment. The electric resistance equals 2Ra'+Rm at Time A, and equals 2Rb'+Rm at Time B.

Herein, the electric resistance Rox of the corroded region 9 in which the thin metal film 2 is corroded entirely in the thickness direction decreases with time with the corroded region 9 grows. However, in the early stages, the electric resistance Rox is significantly higher than the total of 2Ra' and Rm ((2Ra'+Rm)<<Rox), and the influence of Rox is negligible. However, when the electric resistance Rox decreases with the growth of the corroded region 9 in which the thin metal film 2 is corroded entirely in the thickness direction and becomes equal to or lower than 2Ra'+Rm (2Ra'≥Rm Rox), the electric resistance between the terminals 8a and 8b becomes being affected by not only 2Ra'+Rm, but also by Rox and, in time, is affected (determined) approximately only by Rox. Specifically, the electric resistance between the terminals 8a and 8b in this stage is limited by Rox.

In contrast, when the thin metal film 2 has the slit 20 extending approximately parallel with the direction of the diffusion 7 of the corrosive substance 6 as illustrated in FIG. 1, the electric resistance between the terminals 8a and 8b is not determined by Rox, but is determined by (is in proportional to) the growth of the corroded region 9, namely, 2Ra+Rm. This can restrain the device from having decreasing sensitivity with time.

On the basis of these, the configuration of the device according to Embodiment 1 of the present invention from the viewpoint of the electric resistance of thin metal film can be described as follows. Specifically, this corrosive environment monitoring device includes a housing 30, a first thin metal film 11, a second thin metal film 2, and measuring terminals 8a and 8b. The housing 30 includes space 4 that opens only in one side of the housing 30. The first thin metal film 11 is resistant to corrosion by a corrosive substance. The second thin metal film 2 is disposed in the space 4, is supported by the first thin metal film 11, and is susceptible to corrosion by the corrosive substance. Both ends of the first thin metal film 11 constitute the measuring terminals 8a and 8b. The first thin metal film 11 and the second thin metal film 2 are disposed so that the electric resistance between the terminals 8a and 8b forms a series circuit. The series circuit includes a first parallel circuit and a second parallel circuit. The first parallel circuit is formed by the electric resistance RAg of the second thin metal film 2 before the corrosion, and the electric resistance RCr of the first thin metal film. The second parallel circuit is formed by the electric resistance $RAg_2S$ of the second thin metal film 2 after the corrosion, and the electric resistance RCr of the first thin metal film 11. The arrangements of thin metal films described in following other embodiments are intended to meet the above-mentioned conditions in electric resistance.

Embodiment 2

Figure 15:
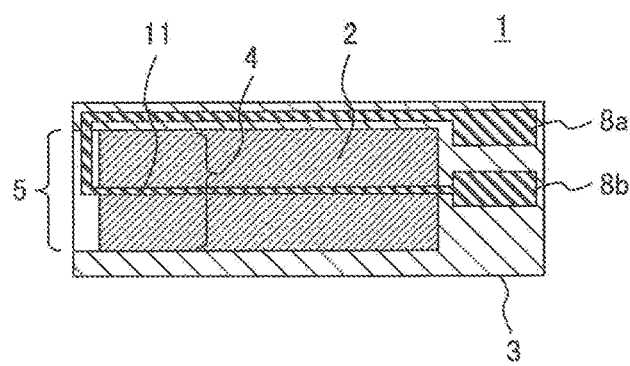
FIG. 15 is a cross-sectional top view of a corrosive environment monitoring device according to Embodiment 2.
Figure 16:
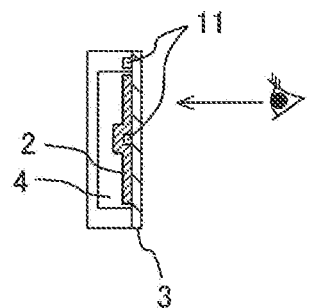
FIG. 16 is a cross-sectional side view of the corrosive environment monitoring device according to Embodiment 2.

FIGS. 15 and 16 illustrate another configuration, according to Embodiment 2, of the corrosive environment monitoring device. FIGS. 15 and 16 are a cross-sectional top view and a cross-sectional side view, respectively, of the device. This configuration differs from the configuration according to Embodiment 1 in that the terminals 8a and 8b are disposed not on the side faces adjacent to the opening 5, but at a side opposite to the side having the opening 5. With this configuration, the supporting member thin metal film 11 extends in the channel 4 in a direction from the bottom toward the opening 5 and turns up in the side having the opening 5. The measuring member thin metal film 2 is disposed on both sides of the thin metal film 11 and extends along the thin metal film 11. The thin metal film 2 is disposed entirely in the transverse direction (width direction) of the channel 4.

As described above, the corrosive environment monitoring device 1 according to Embodiment 2 includes a sensor unit including the thin metal film 2 disposed on or over the insulating substrate 3. The sensor unit is disposed as part of a wall in the channel 4 which has the opening 5. The thin metal films include the thin metal film 2 and the thin metal film 11, where the thin metal film 2 is exposed to the channel 4, and the thin metal film 11 is one (rectangular) thin metal film disposed under the thin metal film 2 which is exposed to the channel 4.

Non-limiting examples of a material to constitute the thin metal film 11 include materials that resist corrosion in the target environment, such as titanium, chromium, gold, palladium, and silver-palladium alloys. The thin metal film 2 has a larger width as compared with the thin metal film 11 disposed below the thin metal film 2. Either one of the thin metal film 2 and the thin metal film 11 may be located above the other, with respect to the insulating substrate 3.

As demonstrated in FIG. 11, the thin metal film 2 (such as a thin silver film) has a resistivity of one twentieth the resistivity of the thin metal film 11 (such as a thin chromium film). On the other hand, the thin silver film has a temperature coefficient of resistance (TCR) of 100 folds the temperature coefficient of resistance of the thin chromium film.

Figure 17:
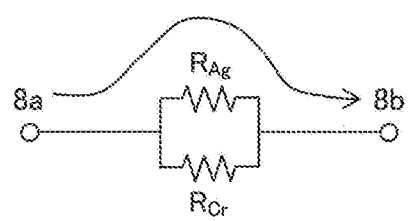
FIG. 17 is a diagram of an equivalent circuit corresponding to the electric resistance of a thin metal film illustrated in FIG. 19.
Figure 18:
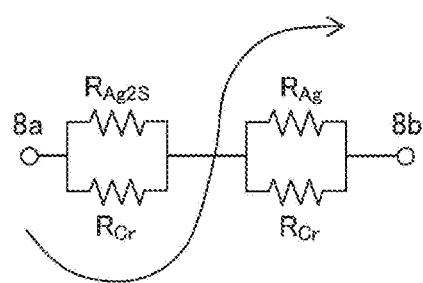
FIG. 18 is a diagram of an equivalent circuit corresponding to the electric resistance of a thin metal film illustrated in FIG. 20.

FIGS. 17 and 18 are circuit diagrams and illustrate, in the initial stage before exposure and after exposure, respectively, the electric resistance between the terminals 8a and 8b of the corrosive environment monitoring device according to Embodiment 2 in the initial stage before exposure. In FIG. 17 which illustrates the circuit in the initial stage, RAg represents the electric resistance of silver Ag; and RCr represents the electric resistance of chromium Cr. The equivalent circuit can be indicated as a parallel circuit of these electric resistances. As demonstrated in FIG. 11, RAg is sufficiently lower than RCr. The current therefore varies depending not on the electric resistance RCr of the thin chromium film, but on the electric resistance RAg of the thin silver film. The current therefore passes in a larger amperage through the thin silver film (electric resistance RAg).

In contrast to this, the equivalent circuit in FIG. 18 which illustrates the state where corrosion proceeds, can be considered as two divided portions. Specifically, a circuit in an uncorroded portion is the same as with the equivalent circuit in FIG. 17; but a circuit in a corroded portion can be indicated as a parallel circuit including the electric resistance $RAg_2S$ of a corroded product of silver (silver sulfide) and the electric resistance RCr of chromium. The circuit as a whole constitutes a series circuit of two closed parallel circuits. In this case, the current varies depending on the electric resistance RCr of the thin chromium film 11 in a corroded region 9 ($Ag_2S$) where the thin silver film is corroded; whereas the current varies depending on the electric resistance RAg of the thin silver film in the uncorroded region. Specifically, in this case, the current flows in a larger amperage from the chromium thin film (electric resistance RCr) side to the thin silver film (electric resistance RAg) side.

Since the corrosive environment monitoring device 1 is placed even in an environment in which the temperature varies, materials to constitute the sensor unit are preferably selected from those having low temperature coefficients of resistance (TCRs). As described above, the thin chromium film 11 has a low temperature coefficient of resistance, but the thin silver film 2 has a temperature coefficient of resistance 100-folds the temperature coefficient of resistance of the thin chromium film. Accordingly, the structure to be employed herein is preferably such a structure as to minimize the variation in electric resistance of the thin silver film.

Figure 19:
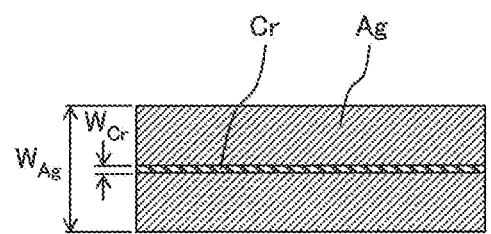
FIG. 19 is a cross-sectional top view of an area around the thin metal films in the initial state.
Figure 20:
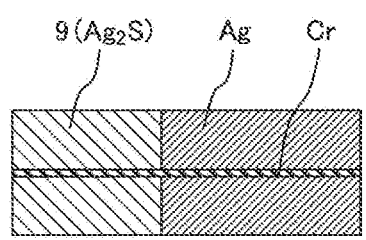
FIG. 20 is a cross-sectional top view of the area around the thin metal films in a state where corrosion proceeds.
Figure 21:
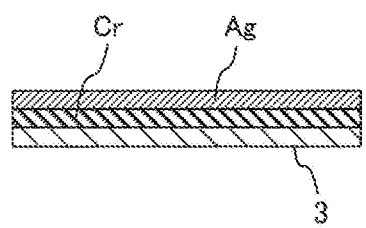
FIG. 21 is a cross-sectional side view of the area around the thin metal films in the initial state.
Figure 22:
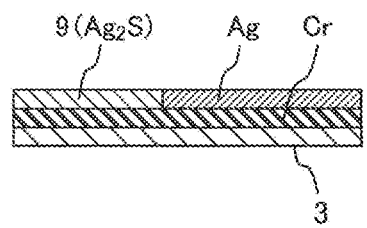
FIG. 22 is a cross-sectional side view of the area around the thin metal films in the state where corrosion proceeds.

FIGS. 19 and 20 are cross-sectional top views, in the initial stage and in the stage where corrosion proceeds, respectively, of an area around the thin metal films. According to Embodiment 2, the thin silver film has a larger width ($W_{Ag}$) as compared with the width ($W_{Cr}$) of the thin chromium film, as illustrated in FIGS. 19 and 20. Advantageously, control of the electric resistance of the thin silver film 2 to be lower allows the electric resistance between the terminals 8a and 8b to less vary depending on temperature change. In addition, when a transparent substrate is employed as the insulating substrate 3, the above-mentioned configuration enables estimation of the degree of corrosion by visual observation of the length of the corroded region, as observed from the transparent substrate. FIGS. 21 and 22 are cross-sectional side views of the areas around the thin metal films, respectively, in FIGS. 19 and 20.

In Embodiment 2, the periphery of the thin metal film 2 is not in contact with the internal surface of the channel 4. This is because, if the periphery of the thin metal film 2 and the internal surface of the channel 4 are in contact with, or overlap, each other due typically to production variation, the corroded region 9 includes an uncorroded region, and this causes measured values of electric resistance to vary, where the thin metal film in the corroded region 9 will be corroded entirely in the thickness direction under the other conditions (under normal conditions).

Embodiment 3

Figure 23:
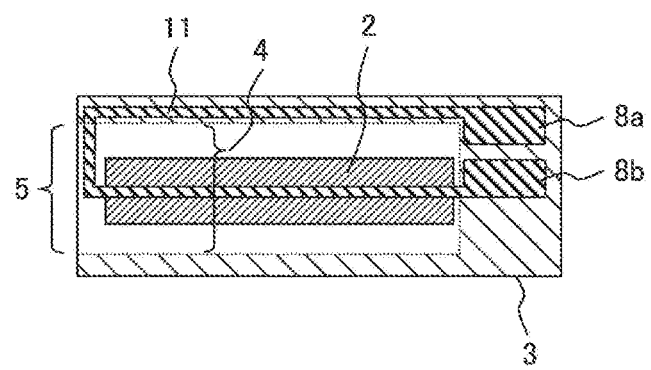
FIG. 23 is a cross-sectional top view of a corrosive environment monitoring device according to Embodiment 3.
Figure 24:
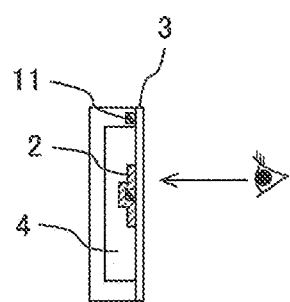
FIG. 24 is a cross-sectional side view of the corrosive environment monitoring device according to Embodiment 3.

FIGS. 23 and 24 illustrate another configuration, according to Embodiment 3, of the corrosive environment monitoring device. FIGS. 23 and 24 are a cross-sectional top view and a cross-sectional side view, respectively, of the device. The configuration according to Embodiment 3 differs from the configuration according to Embodiment 2 in that the measuring member thin metal film 2 has a smaller width as compared with the width of the opening 5 of the channel, in a sensor unit which includes the thin metal film 2 and the thin metal film 11 and which is disposed on (or over) the insulating substrate 3, as illustrated in FIG. 23. By the analysis described in "Estimation of Corrosion Rate of Silver Exposed to Sulfur Vapor" in Journal "Zairyo-to-Kankyo (Corrosion Engineering)", vol. 56, pp. 265-271 (2007), a sensor unit having a ratio of the width of the thin metal film to the width of the channel of 3:5 has a sensitivity about 2.5 folds the sensitivity of a sensor unit having a ratio of the width of the thin metal film to the width of the channel of 1:1. The structure (configuration) according to Embodiment 3 allows corrosion to proceed faster, and is advantageous for rapid corrosive environment monitoring which requires high-sensitivity measurement.

Figure 25:
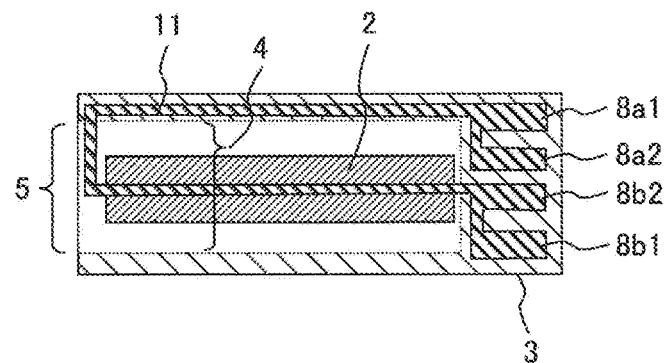
FIG. 25 is a cross-sectional top view of the corrosive environment monitoring device according to Embodiment 3.

FIG. 25 illustrates a modification of the corrosive environment monitoring device according to Embodiment 3. In this modification, the electric resistance of the corrosive environment monitoring device 1 is measured by a four-terminal measurement method using terminals 8a1, 8a2, 8b1, and 8b2. This can eliminate or minimize the influence of conductor resistance.

Embodiment 4

Figure 26:
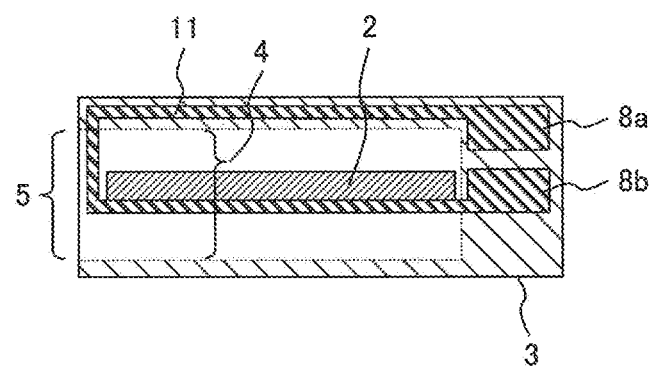
FIG. 26 is a cross-sectional top view of a corrosive environment monitoring device according to Embodiment 4.
Figure 27:
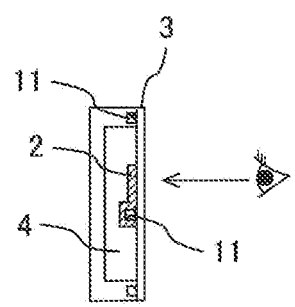
FIG. 27 is a cross-sectional side view of the corrosive environment monitoring device according to Embodiment 4.

FIGS. 26 and 27 illustrate another configuration, according to Embodiment 4, of the corrosive environment monitoring device. FIGS. 26 and 27 are a cross-sectional top view and a cross-sectional side view, respectively, of the device.

In Embodiment 4, the thin metal film 2 and the thin metal film 11 have only to partially overlap each other and to have conduction between them. The thin metal film 2 and the thin metal film 11 may be aligned on one side in the housing. The alignment of the two thin metal films on one side enables easier observation from the transparent substrate 3 side to measure the length of the corroded region and enables precise estimation of degree of corrosion.

Embodiment 5

Figure 28:
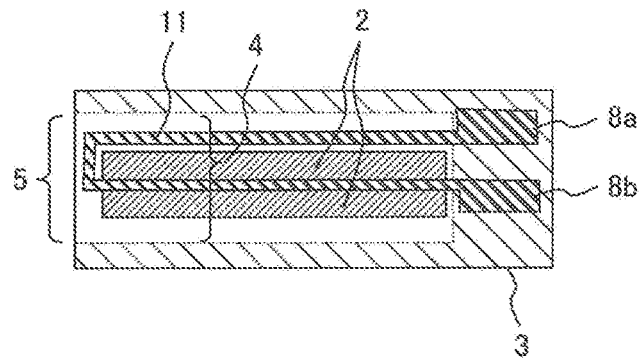
FIG. 28 is a cross-sectional top view of a corrosive environment monitoring device according to Embodiment 5.
Figure 29:
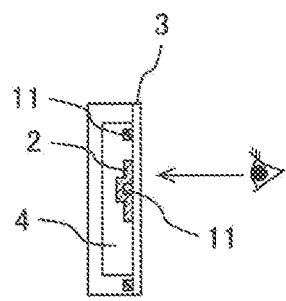
FIG. 29 is a cross-sectional side view of the corrosive environment monitoring device according to Embodiment 5.

According to another embodiment (Embodiment 5), a thin metal film 2 and a thin metal film 11 as in Embodiment 4 may be disposed in the channel, as illustrated in FIGS. 28 and 29. FIGS. 28 and 29 are a cross-sectional top view and a cross-sectional side view, respectively, of the device according to Embodiment 5.

The thin metal film 11 is made from a material that is less corroded (resists corrosion) by the environment. The arrangement of the thin metal film 2 and the thin metal film 11 in the channel actually provides a smaller-sized structure for corrosive environment monitoring.

Next, experimental data and analytical data of a corrosive environment monitoring device having a configuration in common among the embodiments according to the present invention will be described. However, the corrosive environment monitoring device described herein basically has the configuration according to Embodiment 4 illustrated in FIGS. 26 and 27, further employs the four-terminal structure illustrated in FIG. 25, and has dimensions illustrated in FIG. 30.

Figure 30:
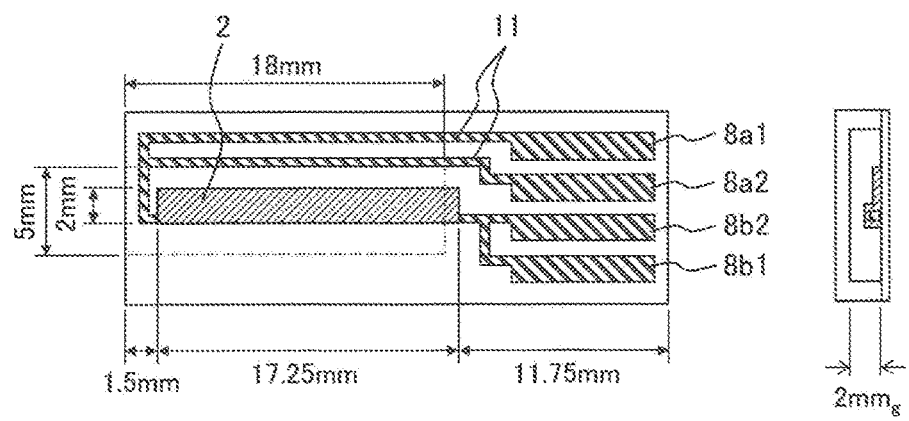
FIG. 30 exemplarily illustrates the dimensions of a corrosive environment monitoring device according to an embodiment of the present invention.

The corrosive environment monitoring device having the dimensions illustrated in FIG. 30 employed, as a sensor unit, a thin silver film having a thickness of 100 nm as the thin metal film 2, and a thin chromium film having a thickness of 100 nm as the thin metal film 11 in the channel. The components have dimensions as given in the figure. The environment to which the device is exposed is an accelerated environment derived from the actual environment and contains 1.0 ppm of $NO_2$, 1.0 ppm of $SO_2$, and 0.5 ppm of $H_2S$, at a temperature of 35° C. and humidity of 75%.

Figure 31:
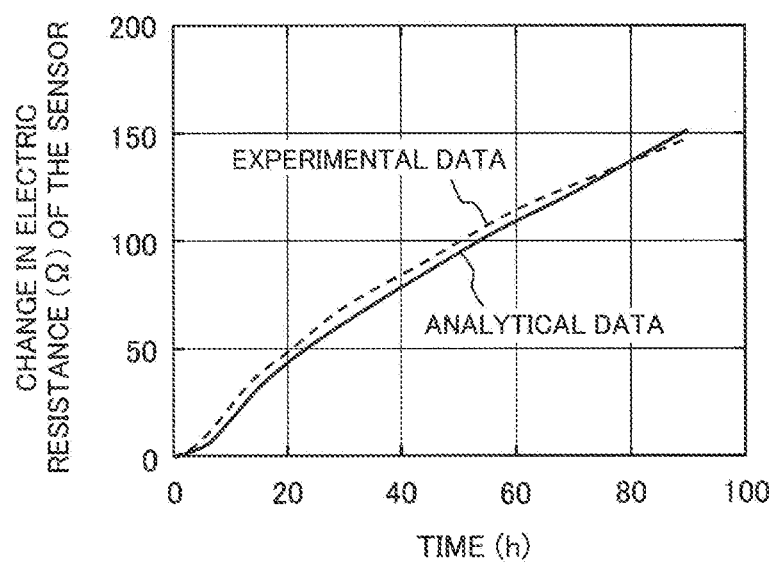
FIG. 31 is a graph illustrating how the electric resistance varies depending on time, where the electric resistance is the output of the corrosive environment monitoring device.

FIG. 31 illustrates how the electric resistance varies depending on the time, where the electric resistance is an output of the corrosive environment monitoring device. The analytical data demonstrates that the experimental data agree with the analytical data highly precisely on the change with time in electric resistance of the sensor.

Figure 32:
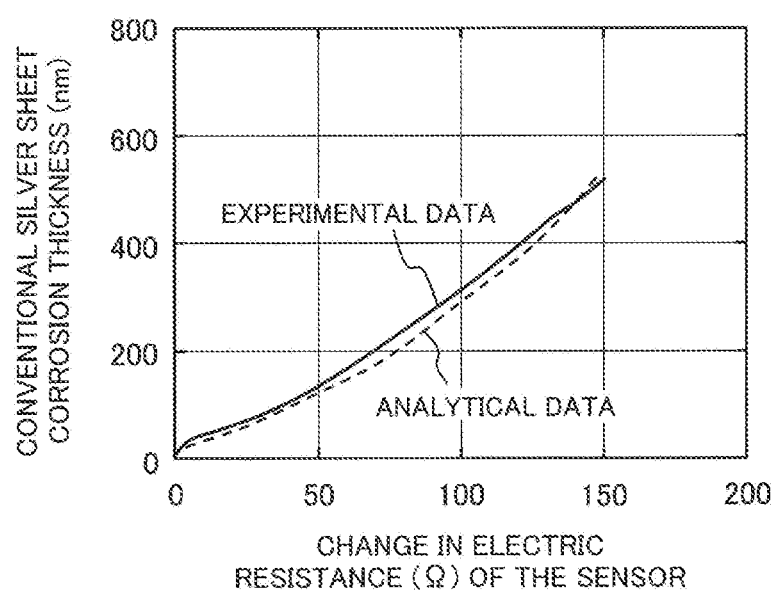
FIG. 32 is a graph illustrating how the electric resistance varies depending on the corrosion thickness of a conventional metal sheet (silver sheet), where the electric resistance is the output of the corrosive environment monitoring device.

FIG. 32 illustrates how the electric resistance of the corrosive environment monitoring device varies depending on the corrosion thickness of a conventional metal sheet (silver sheet), where the electric resistance is an output of the corrosive environment monitoring device. The analytical data demonstrates that the experimental data agree with the analytical data highly precisely.

Assume that the electric resistance is measured while exposing the corrosive environment monitoring device to a target environment, and the corrosion thickness of a metal test specimen is calculated in the above manner. This enables classification of the corrosivity of the ambient atmosphere on the basis of the calculated corrosion thickness, in accordance with any of IEC 654-4 standard, ISO 11844-1 standard, ISO 9223 standard, and ISA 71.04 standard.

When a transparent substrate is used as the insulating substrate 3, the corroded region 9, where the thin metal film is corroded entirely in the thickness direction, can be visually observed, and the lifetime of the sensor can be checked in situ. With an increasing corrosive substance concentration in the environment to be assessed, the metal corrosion rate increases, and the electric resistance also increases.

The corrosive environment monitoring device according to the present invention may include a measurement system in isolation. The corrosive environment monitoring device may also have a configuration in which the device is mounted typically on a printed circuit board and uses a measurement system which has been previously configured on or in the printed circuit board. The corrosive environment monitoring device may also be mounted on a printed circuit board to enable self-diagnosis of the resulting electronic equipment.

The sensitivity of the corrosive environment monitoring device 1 according to any of embodiments of the present invention is determined by the ratio in electric resistance among the thin metal film 2, the corrosion product 9 of the thin metal film 2, and the thin metal film 11. In electric resistance, a preferred relationship among them is: thin metal film 2<thin metal film 11<<corrosion product 9 of thin metal film 2.

These electric resistances are determined by the thickness, width, and length, as well as electric resistivity, of the thin films. Assume that the thin metal film 11 has an electric resistivity significantly higher as compared with the electric resistivity of the thin metal film 2, and this impedes the measurement of the electric resistance change in the corrosive environment monitoring device. In this case, it is preferred to allow the thin metal film 11 to have a larger width as compared with the width of the thin metal film 2. This can reduce the electric resistance change in the corrosive environment monitoring device.

Figure 33:
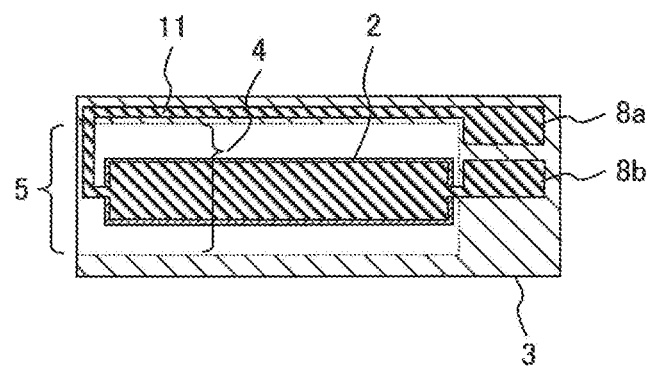
FIG. 33 is a cross-sectional top view of a corrosive environment monitoring device in which a thin metal film 11 has a width approximately equal to the width of a thin metal film 2.
Figure 34:
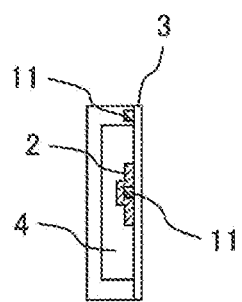
FIG. 34 is a cross-sectional side view of the corrosive environment monitoring device in which the thin metal film 11 has a width approximately equal to the width of the thin metal film 2.
Figure 35:
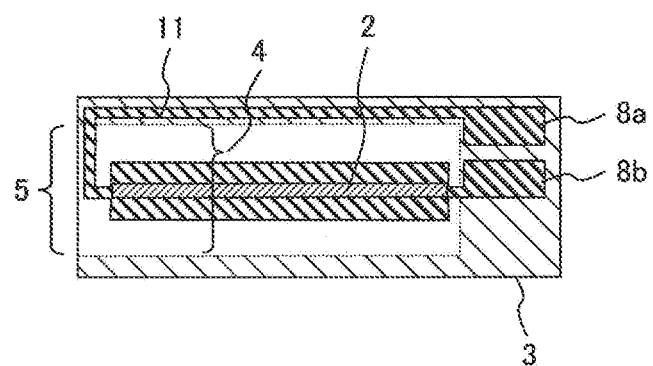
FIG. 35 is a cross-sectional top view of a corrosive environment monitoring device in which the thin metal film 11 has a larger width as compared with the width of the thin metal film 2.
Figure 36:
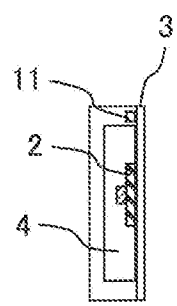
FIG. 36 is a cross-sectional side view of the corrosive environment monitoring device in which the thin metal film 11 has a larger width as compared with the width of the thin metal film 2.

Specifically, it is advantageous to allow the thin metal film 11 to have a width approximately equal to the width of the thin metal film 2, as illustrated in FIGS. 33 and 34. For further reducing the change in electric resistance of the corrosive environment monitoring device, it is more advantageous to allow the thin metal film 11 to have a larger width as compared with the width of the thin metal film 2, as illustrated in FIGS. 35 and 36. FIGS. 33 and 35 are cross-sectional top views, and FIGS. 34 and 36 are cross-sectional side views.

As described above, the configurations according to the present invention do not require a suction pump in a gas introducing unit or another large-sized structure capable of performing measurement in an environment at a constant flow rate. The configurations thereby less consume power and enable simple measurement. The configurations according to the present invention have an opening in part of the channel and employs a thin metal film covered by (exposed to) the channel. This enables accurate determination of the amount (degree) of corrosion of the thin metal film, where the corrosion proceeds from the opening, and can restrain the variation in corrosion amount (degree), where the corrosion amount (degree) varies depending on the flow rate in the atmosphere in the target environment; on local corrosion (such as corrosion adjacent to a portion where dust and/or salts are deposited) of the sensor unit; and/or on the thickness of the metal film. When at least the substrate is transparent, the corrosion amount (degree) can be easily visually observed.

Many embodiments have been described above, and all of them have the configuration as follows in common, and on the basis of the common concept (configuration), some modifications, variations, and equivalent arrangements have been made. Specifically, the corrosive environment monitoring device having the configuration includes a housing, a first thin metal film, a second thin metal film, and terminals. The housing has an opening in one side thereof. The other sides of the housing than the one side are sealed to form space inside the housing. The first thin metal film extends in a direction from the bottom of the space toward the opening. The first thin metal film is resistant to corrosion by a corrosive substance and serves as a supporting member. The second thin metal film extends in the space in a direction from the bottom of the space toward the opening and is supported by the first thin metal film. The second thin metal film is susceptible to corrosion by the corrosive substance and serves as a measuring member. The terminals are disposed at both ends of the first thin metal film, where an external voltage is to be applied to the terminals. The first thin metal film includes one first thin metal film extending in a direction from the bottom of the space toward the opening. The second thin metal film is disposed on one or both sides of the one first thin metal film and extends in the space in a direction from the bottom toward the opening.

LIST OF REFERENCE SIGNS

1: corrosive environment monitoring device,
2: thin metal film,
3: insulating substrate,
4: space,
5: opening,
6: corrosive substance,
8a, 8b: terminal,
9: corroded region,
11: thin metal film,
30: housing.

The invention claimed is:
1. A corrosive environment monitoring device comprising:
 a housing having an opening in one side thereof, other sides of the housing than the one side being sealed to form space inside the housing;
 a first thin metal film extending in a direction from a bottom of the space toward the opening, the first thin metal film being resistant to corrosion by a corrosive substance and serving as a supporting member;
 a second thin metal film extending in the space in a direction from the bottom of the space toward the opening and being supported by the first thin-film metal, the second thin metal film being susceptible to corrosion by the corrosive substance and serving as a measuring member; and
 terminals being disposed at both ends of the first thin metal film, where an external voltage is to be applied to the terminals,
 the first thin metal film including one first thin metal film extending in a direction from the bottom of the space toward the opening,
 the second thin metal film being disposed on one or both sides of the one first thin metal film and extending in the space in a direction from the bottom toward the opening.
2. The corrosive environment monitoring device according to claim 1,
 wherein the first thin metal film is disposed in a U shape along the space so as to support the first thin metal film by three sides of the U-shaped first thin metal film, where the three sides exclude a side facing the opening, and
 wherein the second thin metal film has a slit extending from the center of the opening toward the bottom of the space.
3. The corrosive environment monitoring device according to claim 1,
 wherein the first thin metal film extends from the center of the opening toward the bottom of the space, and
 wherein the second thin metal film is disposed on one or both sides of the first thin metal film and extends in the space from the bottom toward the opening.
4. The corrosive environment monitoring device according to claim 3,
 wherein the second thin metal film extends in the space to the bottom of the space.
5. The corrosive environment monitoring device according to claim 3,
 wherein the second thin metal film is disposed in a part of the space.
6. The corrosive environment monitoring device according to claim 1,
 wherein the terminals are a pair of terminals disposed on an opposite side of the space to the opening,
 wherein the first thin metal film is a U-shaped supporting member disposed so as to couple the pair of terminals to each other, the U-shaped supporting member including: a first portion extending in a direction from one of the pair of terminals toward the opening; a second portion extending in a direction from the opening to the other of the pair of terminals; and a third portion disposed between the first portion and the second portion at the side having the opening, and
 wherein at least one of the first and second portions of the U-shaped supporting member is present in the space and supports the first thin metal film.
7. The corrosive environment monitoring device according to claim 1,
 wherein the first thin metal film is held by a substrate portion of the housing, and
 wherein at least the substrate portion of the housing is optically transparent.
8. The corrosive environment monitoring device according to claim 1,
 wherein the terminals disposed at both ends of the first thin metal film, to which an external voltage is to be applied, have a four-terminal structure.
9. The corrosive environment monitoring device according to claim 1,
 wherein the second thin metal film before corrosion has a sufficiently lower electric resistance as compared with the electric resistance of the first thin metal film, and
 wherein the first thin metal film after corrosion has a sufficiently higher electric resistance as compared with the electric resistance of the first thin metal film.
10. The corrosive environment monitoring device according to claim 1,
 wherein the device measures an electric resistance of the second thin metal film, where the electric resistance varies depending on growth of a corroded region of the second thin metal film, and where the growth of the corroded region is caused by the corrosive substance entering the space through the opening.
11. The corrosive environment monitoring device according to claim 10,
 wherein the corroded region of the second thin metal film grows in a direction along which the corrosive substance entering through the opening diffuses, and
 wherein the device measures the electric resistance of the second thin metal film, where the electric resistance increases with the growth of the corroded region.
12. The corrosive environment monitoring device according to claim 11,
 wherein the electric resistance is measured based on a sum of the electric resistance of the first thin metal film and the electric resistance of the second thin metal film.

13. The corrosive environment monitoring device according to claim 12,
wherein the electric resistance of the second thin metal film increases with the growth of the corroded region.

14. The corrosive environment monitoring device according to claim 1,
wherein the first thin metal film is made from a material containing at least one selected from the group consisting of titanium; chromium; gold; palladium; and silver-palladium alloys.

15. The corrosive environment monitoring device according to claim 1,
wherein the second thin metal film is made from a material containing at least one selected from the group consisting of copper; silver; aluminum; iron; and zinc.

16. A corrosive environment monitoring device comprising:
a housing including space that opens only in one side of the housing;
a first thin metal film being resistant to corrosion by a corrosive substance;
a second thin metal film being disposed in the space, being supported by the first thin metal film, and being susceptible to corrosion by the corrosive substance; and
measuring terminals being constituted by both ends of the first thin metal film,
wherein the first thin metal film and the second thin metal film are disposed so that an electric resistance between the terminals forms a series circuit which includes:
a first parallel circuit being formed of an electric resistance of the second thin metal film before the corrosion, and an electric resistance of the first thin metal film; and
a second parallel circuit being formed of an electric resistance of the second thin metal film after the corrosion, and the electric resistance of the first thin metal film.

17. The corrosive environment monitoring device according to claim 16,
wherein the second thin metal film before the corrosion has a sufficiently lower electric resistance as compared with the electric resistance of the first thin metal film, and
wherein the first thin metal film after corrosion has a sufficiently higher electric resistance as compared with the electric resistance of the first thin metal film.

18. The corrosive environment monitoring device according to claim 16,
wherein the second thin metal film has a sufficiently higher temperature coefficient of resistance as compared with the temperature coefficient of resistance of the first thin metal film.

19. A method for monitoring a corrosive environment based on a degree of corrosion of a second thin metal film, the method comprising the steps of:
providing a housing having an opening in one side thereof, other sides of the housing than the one side being sealed to form a space inside the housing, wherein a first thin metal film extends in a direction from a bottom of the space toward the opening and the first thin metal film is resistant to corrosion by a corrosive substance and serves as a supporting member, and wherein the second thin metal film extends in the space in a direction from the bottom of the space toward the opening and is supported by the first thin-film metal, wherein the second thin metal film is susceptible to corrosion by the corrosive substance and serves as a measuring member;
providing a terminal at both ends of the first thin metal film;
applying an external voltage to the terminals of the first thin metal film;
measuring an electric resistance of the second thin metal film, the electric resistance varying depending on growth of a corroded region of the second thin metal film; and
quantitatively determining a corrosivity of the environment based on the measured electric resistance.

* * * * *